Feb. 5, 1957  D. D. ZEBLEY  2,780,345
TROLLEY CONVEYOR DIP CONSTRUCTION
Filed April 22, 1953
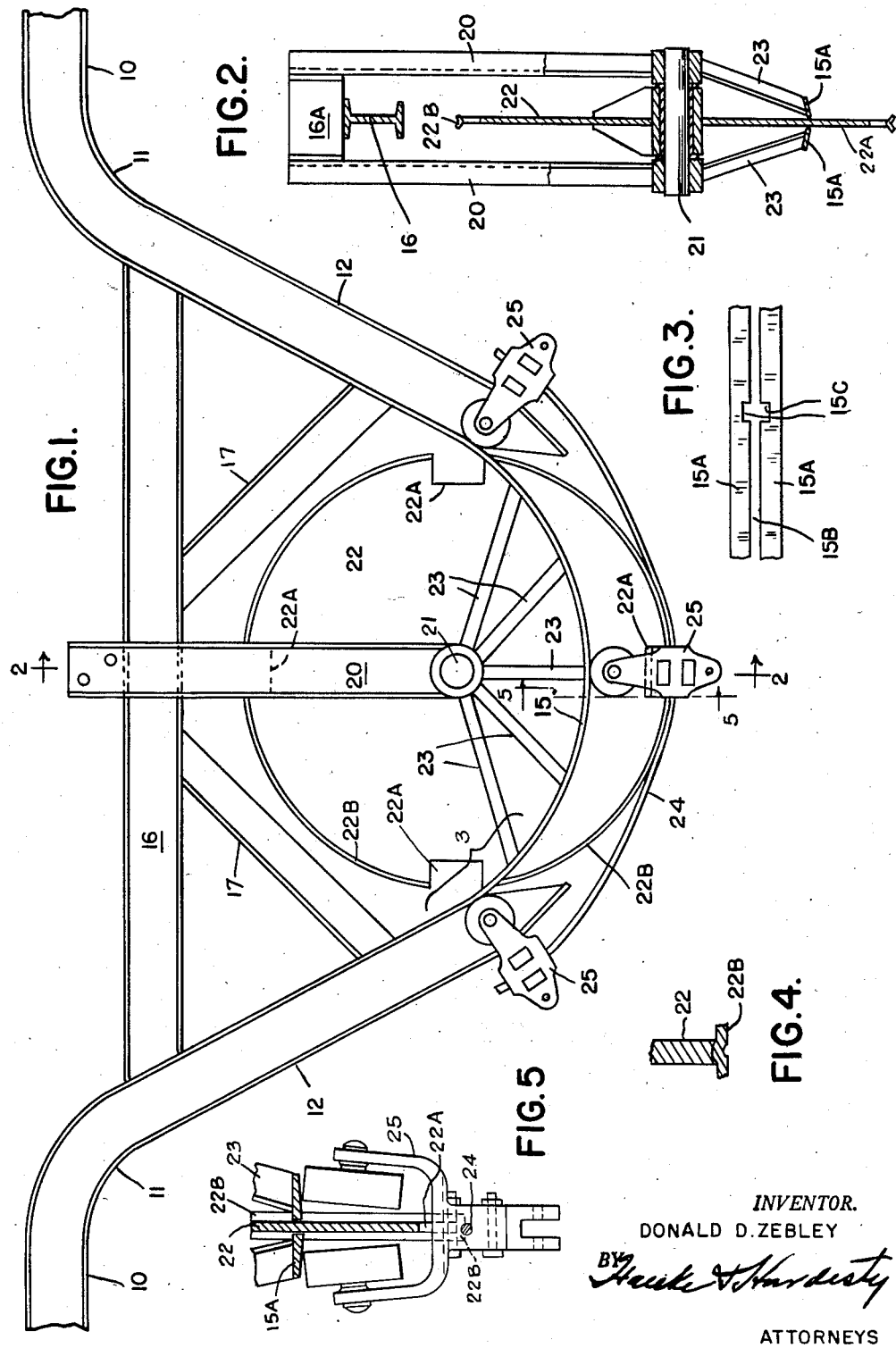
INVENTOR.
DONALD D. ZEBLEY
BY Hauck & Hardesty
ATTORNEYS United States Patent Office 2,780,345
Patented Feb. 5, 1957

2,780,345

TROLLEY CONVEYOR DIP CONSTRUCTION

Donald D. Zebley, Detroit, Mich.

Application April 22, 1953, Serial No. 350,349

5 Claims. (Cl. 198—177)

The present invention relates to conveyor dip construction and more specifically to dip construction for conveyors in which the roller-mounted load carrying trolley brackets are connected by and moved by means of cable.

As is quite common practice, in processing articles carried by such conveyors, it is sometimes necessary to dip such articles in tanks filled with water or other fluid, so the conveyor track is curved down and up to produce such dipping.

Among the objects of the invention is to provide dip construction which requires much less space than is necessary with the conventional chain conveyor in order to obtain the desired vertical travel of the load.

Another object is to provide for contact between the rollers of the trolley brackets and the conveyor track continuously during the dipping movement of the load.

Still other objects will readily occur to those skilled in the art upon reference to the following description and the accompanying drawings in which—

Fig. 1 is a side elevation of a dip construction according to the present invention.

Fig. 2 is a section on line 2—2 of Fig. 1, the trolley bracket being omitted.

Fig. 3 is a top plan view of that portion of the track bracketed and numbered 3 in Fig. 1.

Fig. 4 is a portion of Fig. 2, enlarged.

Fig. 5 is an enlarged sectional view on the line 5—5 in Fig. 1.

In the drawing, the conventional I-beam track of a traveling conveyor is indicated at 10, this being commonly horizontal with the load carrying trolley brackets rolling upon and supported by the lower flange of the beam.

In the present construction the beam element 10 is formed to provide a downwardly displaced portion or dip comprising the longitudinally spaced curving portions 11 of relatively short radius, which merge into straight downwardly convergent portions 12 the lower ends of which are connected by an arcuate section 15. Throughout this section the web and lower flanges of the beam are cut away, leaving only its upper flanges as transversely spaced ribbons 15A, see Fig. 3.

As shown in Fig. 1, the portions 12 of the track are supported by a horizontal brace 16 extending between them and angularly arranged braces 17 extending between the brace 16 and the lower part of downwardly extending portions 12.

Fixed to a suitable filler block 16A carried by the member 16 and extending vertically downward is a pair of supports 20, preferably channel members. These carry at their lower ends an axle 21 upon which is rotatable a wheel 22, and also a plurality of struts 23 spreading fan-wise and fixed at their outer ends to the track flange parts 15A whereby, to maintain their curvature and spacing.

The wheel 22 consists of a disc of suitable metal having evenly spaced notches 22A of such size and shape as to embrace the body portion of one of the trolley brackets 25 and between the notches has fixed to its edge grooved rim portions 22B of a width somewhat greater than the thickness of the disc or the width of the slot 15B between track portions 15A. In order to permit the wheel to pass through the slot 15B, track portions 15A are notched as indicated at 15C in Fig. 3 to accommodate passage of the rim portions 22B through the ribbons.

In the operation of the dip, the trolley brackets, having their loads suspended from their lower ends, travel along the track 10 and are supported by the latter, the trolley wheels rolling upon the lower double flange. They will continue thus until they reach a point somewhere near the lower end of the portion 12. However, with sufficient tension on the conveyor cable 24, they will leave the lower double flange and begin to roll upon the under faces of the upper double flange and will roll thereon under the portion 15 of the track and then up the other part 12, transferring from the upper flange to the lower flange.

As the brackets reach the cutaway portion of the I-beam, the disc of wheel 22 moves in between the bracket rolls and maintains their position laterally of the track and the cable is prevented from slackening upwardly by being received in the grooves of the rim members 22B.

As they reach the arcuate portion 15 of the track, the brackets are picked up by the notches 22A in wheel 22 and maintained in proper position, both vertically and horizontally as the wheel 22 is between the rolls carried by the brackets. In other words, the wheel 22 acts in the place of the web of the I-beam, to maintain the rolls on the parts 15A of the track.

Now having described the invention and the preferred embodiment thereof, what is claimed is:

1. A track structure for trolley conveyors of the type having spaced cable-connected trolley brackets which are provided with rollers that travel on the lower flanges of an I-beam track, said structure comprising an I-beam track element having a downwardly displaced portion which includes an arcuate section whereat the web and lower flanges of said element are cut away whereby the upper beam flanges provide a pair of transversely spaced ribbons which are adapted to be engaged by the trolley rollers during their traverse of said arcuate section; and a wheel rotatably mounted adjacent said arcuate track section and having its peripheral portion extending through the slot between said spaced ribbons for engagement with and guidance of the trolley brackets and cable during their traverse of the arcuate track section.

2. A trolley conveyor track structure according to claim 1, wherein said peripheral portion of the wheel is provided with circumferentially spaced recesses for reception of the trolley brackets, and such wheel portion is further provided with a cable-engaging rim of a width greater than that of the slot between the ribbons, and said ribbons are provided with transverse notches to accommodate the passage of said wheel rim.

3. A track structure for trolley conveyors of the type having roller-mounted trolley brackets connected at intervals to a traversing cable, said structure comprising an I-beam element formed to porvide a downwardly displaced track portion having an arcuate lower section throughout which the web and lower flanges of the beam are cut away to leave only the upper beam flanges as a pair of transversely spaced ribbons; a frame-work adjacent such track section, including means connected to said ribbons for maintaining their curvature and spacing; and a wheel journaled in said framework above said arcuate track section and extending downwardly between said ribbons for engagement with the trolley brackets during their traverse of said track section, whereby to maintain the bracket rollers in alinement with the ribbons.

4. A track element for trolley conveyors of the type having cable-connected roller-mounted trolley brackets, said element comprising an I-beam formed to provide a downwardly displaced track portion throughout a lower section of which the web and lower flanges of the beam are cut away to leave only the upper beam flanges as a pair of transversely spaced trolley-roller engageable ribbons.

5. A track structure for trolley conveyors of the type having cable-connected roller-mounted trolley brackets, said structure comprising an I-beam element formed to provide a downwardly displaced track portion having an arcuate lower section throughout which the web and lower flanges of the beam are cut away to leave only the upper beam flanges as a pair of transversely spaced ribbons; and means adjacent said lower section for maintaining the trolley bracket rollers in engagement with the under faces of said ribbons.

References Cited in the file of this patent

UNITED STATES PATENTS

| 1,949,691 | Neher et al. | Mar. 6, 1934 |
| 2,187,498 | Landahl | Jan. 16, 1940 |

FOREIGN PATENTS

| 622,808 | Great Britain | May 6, 1949 |